United States Patent
Nordbruch

(10) Patent No.: US 10,665,101 B2
(45) Date of Patent: May 26, 2020

(54) CONCEPT FOR CONTROLLING TRAFFIC INSIDE A PARKING FACILITY

(71) Applicant: Robert Bosch GmbH, Stuttgart (DE)

(72) Inventor: Stefan Nordbruch, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/308,123

(22) PCT Filed: May 8, 2017

(86) PCT No.: PCT/EP2017/060914
§ 371 (c)(1),
(2) Date: Dec. 7, 2018

(87) PCT Pub. No.: WO2017/215841
PCT Pub. Date: Dec. 21, 2017

(65) Prior Publication Data
US 2019/0180620 A1   Jun. 13, 2019

(30) Foreign Application Priority Data
Jun. 17, 2016   (DE) .......... 10 2016 210 886

(51) Int. Cl.
*B60W 30/06*   (2006.01)
*G08G 1/14*   (2006.01)
*G06K 9/00*   (2006.01)

(52) U.S. Cl.
CPC .......... *G08G 1/143* (2013.01); *G06K 9/00812* (2013.01); *G06K 9/00825* (2013.01);
(Continued)

(58) Field of Classification Search
None
See application file for complete search history.

(56) References Cited

U.S. PATENT DOCUMENTS

2006/0250278 A1   11/2006   Tillotson et al.
2007/0050240 A1   3/2007   Belani et al.
(Continued)

FOREIGN PATENT DOCUMENTS

DE   10220934 A1   1/2004
DE   102011103743 A1   3/2012
(Continued)

OTHER PUBLICATIONS

International Search Report for PCT/EP2017/60914, dated Sep. 8, 2017.

*Primary Examiner* — John F Mortell
(74) *Attorney, Agent, or Firm* — Norton Rose Fulbright US LLP; Gerard Messina

(57) ABSTRACT

A method is described for controlling traffic inside a parking facility, including the following steps: —dividing the parking facility into multiple tiles, —detecting the multiple tiles with the aid of one or multiple surroundings sensor(s) to ascertain surroundings sensor data corresponding to the detection, —ascertaining a particular occupancy state of the multiple tiles based on the surroundings sensor data, —controlling traffic inside the parking facility based on the ascertained occupancy states. Further, a device is described for controlling traffic inside a parking facility. Also described are a parking facility for motor vehicles, and a computer program.

15 Claims, 2 Drawing Sheets

(52) U.S. Cl.
    CPC ............ *G08G 1/146* (2013.01); *G08G 1/147* (2013.01); *G08G 1/149* (2013.01)

(56) References Cited

U.S. PATENT DOCUMENTS

| | | | |
|---|---|---|---|
| 2016/0029224 A1* | 1/2016 | Edge | G01S 5/0252 |
| | | | 455/456.1 |
| 2017/0124874 A1* | 5/2017 | Cai | G06K 9/00771 |
| 2017/0144654 A1* | 5/2017 | Sham | B60W 30/06 |
| 2017/0197615 A1* | 7/2017 | Elie | B60W 10/20 |

FOREIGN PATENT DOCUMENTS

| | | |
|---|---|---|
| DE | 102012222562 A1 | 6/2014 |
| DE | 102013211126 A1 | 12/2014 |
| DE | 102014211557 A1 | 12/2015 |
| EP | 2747053 A1 | 6/2014 |
| EP | 3029602 A1 | 6/2016 |

* cited by examiner

CONCEPT FOR CONTROLLING TRAFFIC INSIDE A PARKING FACILITY

FIELD OF THE INVENTION

The present invention relates to a method for controlling traffic inside a parking facility. The present invention furthermore relates to a device for controlling traffic inside a parking facility. The present invention furthermore relates to a parking facility for motor vehicles. The present invention relates to a computer program.

BACKGROUND INFORMATION

German Published Patent Application No. 10 2013 211 126 A1 describes a method for modeling surroundings of a vehicle. The surroundings may be, for example, a parking garage.

German Published Patent Application No. 10 2012 222 562 A1 describes a system for managed parking areas for transferring a vehicle from a starting position into a destination position. The vehicle drives in a driverless fashion during the transfer.

If vehicles driving in a driverless fashion as well as manually controlled vehicles drive simultaneously inside a parking facility, a need thus exists for efficient control of corresponding traffic.

SUMMARY

The object on which the present invention is based may be considered that of providing a concept for efficiently controlling traffic inside a parking facility.

According to one aspect, a method for controlling traffic inside a parking facility is provided, including the following steps:
  dividing the parking facility into multiple tiles,
  detecting the multiple tiles with the aid of one or multiple surroundings sensor(s) in order to ascertain surroundings sensor data corresponding to the detection,
  ascertaining a particular occupancy state of the multiple tiles based on the surroundings sensor data,
  controlling traffic inside the parking facility based on the ascertained occupancy states.

According to another aspect, a device is provided for controlling traffic inside a parking facility, the device being designed to carry out the method for controlling traffic inside a parking facility.

According to another aspect, a parking facility for motor vehicles is provided, the parking facility including the device for controlling traffic inside a parking facility.

According to another aspect, a computer program is provided, which includes program code for carrying out the method for controlling traffic inside a parking facility when the computer program is executed on a computer.

The present invention is based on the finding that the above object may be achieved in that by dividing the parking facility into multiple tiles and ascertaining the respective occupancy state of the tiles, the parking facility may be efficiently monitored as to where participants in the traffic are located, so that the monitoring may be used as the basis for a control of the traffic. This thus yields the technical advantage that the traffic may be controlled efficiently.

The division into tiles yields the technical advantage in particular that tiles may be monitored particularly efficiently. For example, it is sufficient to monitor edges of the tiles, for example, with the aid of light barriers, in order to detect whether an object leaves the tile or affects or drives on it, respectively.

The division of the tiles furthermore yields the advantage that tiles are generally simpler to monitor than an entire area around the motor vehicle. For example, it may be sufficient to monitor only the boundaries of the tiles, for example, with the aid of light barriers, instead of the entire tile. Thus, in addition to distance-measuring sensors, for example, radar sensors or ultrasonic sensors, further sensors, for example, light barriers here, may also be used for monitoring the tiles.

Furthermore, necessary computations may be carried out in tile units, so that object-motor vehicle distances are no longer necessarily required.

A parking facility within the meaning of the present invention may also be referred to as a parking area and is used as a storage area for motor vehicles. The parking facility therefore forms in particular a contiguous area, which includes multiple parking spaces (in the case of a parking facility on private property) or parking meters (in the case of a parking facility on public property). According to one specific embodiment, the parking facility is designed as a multistory parking garage. According to one specific embodiment, the parking facility is designed as a parking deck.

According to one specific embodiment, it is provided that a particular occupancy state of one or multiple of the tiles is predicted based on the surroundings sensor data, the traffic furthermore being controlled based on the particular predicted occupancy state.

This yields the technical advantage in particular that the traffic may be controlled efficiently, insofar as a prediction for a future occupancy state (prediction) is also used as the basis for the traffic control.

According to one specific embodiment, the prediction includes predicting a movement of an object detected with the aid of a surroundings sensor. For example, the prediction includes that a movement profile of an object, which was detected with the aid of a surroundings sensor, is established or ascertained.

This thus means in particular that a movement of an object is predicted over a time.

For example, the prediction includes that a statement is made that a specific tile, which is presently occupied, will become vacant in a time ascertained based on the prediction, for example, 30 seconds.

Based on this statement, according to one specific embodiment, the traffic control, i.e., the control of the traffic, is carried out.

This thus means in particular that the prediction of a particular occupancy state of one or multiple of the tiles includes, according to one specific embodiment, that in the case of a presently occupied tile it is ascertained when it will become vacant again. This information, i.e., in particular the point in time at which a presently occupied tile will become vacant again, is used in particular for the control of the traffic.

This thus means in particular that the prediction of a particular occupancy state of one or multiple of the tiles includes, according to one specific embodiment, that in the case of a presently vacant tile it is ascertained when it will become occupied again. This information, i.e., in particular the point in time at which a presently vacant tile will become occupied again, is used in particular for the control of the traffic.

According to one specific embodiment, it is provided that the one or the multiple surroundings sensor(s) include one or multiple surroundings sensor(s) of a motor vehicle located inside the parking facility and/or one or multiple surroundings sensor(s) of the parking facility.

This yields the technical advantage in particular that the tiles may be monitored efficiently.

This thus means in particular that, for example, one or multiple of the tiles are detected or monitored with the aid of one or multiple surroundings sensor(s) of a motor vehicle located inside the parking facility. Such a motor vehicle is, for example, a stored, i.e., in particular a parked motor vehicle or, for example, a motor vehicle driving inside the parking facility. A motor vehicle driving inside the parking facility is, for example, a motor vehicle controlled with the aid of a human driver or a motor vehicle driving in a driverless fashion, for example, a remote-controlled motor vehicle or an autonomously driving motor vehicle.

This thus means in particular that the one or the multiple tiles are monitored with the aid of one or multiple surroundings sensor(s) which are associated with an infrastructure of the parking facility.

For example, it is provided that surroundings sensors are situated on infrastructure elements of the parking facility, for example, columns, walls, or ceilings.

In particular if surroundings sensors of the parking facility as well as surroundings sensors of the motor vehicle are used for detecting the tiles, particularly accurate detection of the tiles and thus particularly accurate monitoring of the tiles and thus ultimately of the parking facility may be effectuated.

For example, it is provided according to one specific embodiment that the device receives surroundings sensor data from one or multiple surroundings sensor(s) of the motor vehicle via a communication network. This thus means in particular that a motor vehicle located inside the parking facility detects its own surroundings with the aid of its surroundings sensor or sensors and transmits the corresponding surroundings sensor data to the device.

According to one specific embodiment, the device includes a communication interface which is designed to receive surroundings sensor data of a motor vehicle located inside the parking facility.

According to one specific embodiment, a communication network within the meaning of the present invention includes a mobile radio communication network and/or a WLAN communication network.

In one specific embodiment, it is provided that the traffic is furthermore controlled based on a particular historic occupancy state of one or multiple of the tiles, which indicates in each case an occupancy state of the corresponding tile in the past.

This yields the technical advantage in particular that the traffic may be controlled efficiently. For example, it is provided that it is ascertained based on the particular historic occupancy states when a tile is occupied or unoccupied at a specific future point in time.

For example, it is provided according to one specific embodiment that the prediction, as described above, is carried out based on the particular historic occupancy state.

This yields the technical advantage in particular that the prediction may be carried out efficiently.

A historic occupancy state of a tile refers in particular to an occupancy state of the tile at a specific point in time which is in the past, i.e., a past point in time.

Based on the historic occupancy states, for example, a probability for a particular occupancy state of one or multiple tiles is ascertained for the future. For example, based on the historic occupancy states, it is ascertained that on a specific day or at a specific time of day, respectively, a specific tile is occupied or unoccupied with a specific probability. For example, based on the historic occupancy states, it is ascertained that on a specific day or a specific time of day, respectively, a door or a gate which is situated directly adjacent to a specific tile is opened with a specific probability, for example, every three minutes, in general, for example, is opened with a specific frequency. These abovementioned results of the corresponding ascertainment are preferably used for the control of the traffic.

According to one specific embodiment, it is provided that the control of the traffic is free of use of one or multiple of the following parameters: metadata, in particular height and/or width and/or length and/or type of a detected motor vehicle, type of a detected object, distance between two detected objects.

This yields the technical advantage in particular that the control may be carried out particularly efficiently with regard to computing time. Therefore, for example, computing time may be saved in an efficient manner.

The fact that the control of the traffic is free of a use of one or multiple of the parameters thus means in particular that these parameters are not taken into consideration for the control of the traffic. They are thus not incorporated into a corresponding computation.

A type of a detected object is, for example: a motor vehicle, a pedestrian, a bicyclist, or an animal.

This thus means that the detected object is classified.

In particular, if one refrains from using the distance between two detected objects for the control, it may therefore also advantageously be refrained from ascertaining the corresponding distance. In general, surroundings sensors which may ascertain the distances to an object are necessary for such an ascertainment. Such surroundings sensors are, for example, radar sensors or ultrasonic sensors.

Therefore, for example, surroundings sensors which do not permit distance measurement may also be used for monitoring the tiles. Such surroundings sensors are, for example, light barrier sensors or pressure sensors. Therefore, multiple different sensor technologies may thus advantageously be used to monitor the tiles.

In one specific embodiment, it is provided that the traffic is exclusively controlled based on particular occupancy states of the tiles.

This yields the technical advantage in particular that the traffic may be controlled efficiently. In particular, corresponding computing time may thus be saved in an efficient manner. Therefore, for example, unforeseen events may be reacted to efficiently and with a short reaction time in an advantageous manner.

A risk of collision may thus be reduced, for example.

The fact that the traffic is exclusively controlled based on particular occupancy states of the tiles makes it advantageously possible that only the occupancy state of the tiles has to be ascertained. This thus means in particular that it is provided according to one specific embodiment that an occupancy state of the tiles is ascertained exclusively based on the surroundings sensor data. Thus, solely the information as to whether a tile is occupied or unoccupied is available. The information is not available, however, as to how large the object is which occupies a tile, or what type the object is which occupies the tile.

However, for efficient control of the traffic, it is generally sufficient to know and use solely the occupancy state of the tiles. The information that a specific motor vehicle having specific dimensions is located on a tile is generally not necessary for efficient control of the traffic and typically lengthens and complicates corresponding computations which are necessary to control the traffic.

According to one specific embodiment, it is provided that one or multiple of the tiles each have a width of a lane of the parking facility.

In one specific embodiment, it is provided that one or multiple of the tiles each have a length between 0.75 m and 1.5 m, in particular a length of 1 m.

This yields the technical advantage in particular that a lane of the parking facility may be monitored efficiently, so that traffic inside this lane may be controlled efficiently.

A lane is delimited from its surroundings, for example, with the aid of boundary lines, for example, dashed boundary lines.

According to one specific embodiment, it is provided that one or multiple of the tiles each correspond to a parking space, in particular a parking bay.

This yields the technical advantage in particular that the parking space, in particular the parking bay, may be efficiently monitored.

A parking space, in particular a parking bay, is delimited from its surroundings, for example, with the aid of one or multiple lines, in particular dashed lines.

According to one specific embodiment, it is provided that the tiles each have one of the following shapes: square, rectangle, circle, ellipse.

This variety of shapes yields the technical advantage in particular that the parking facility may be divided efficiently.

In one specific embodiment, it is provided that a particular size of the tiles is selected as a function of one or multiple of the following parameters: number of surroundings sensors, detection accuracy of the surroundings sensor or sensors, object velocity of a detected object.

This yields the technical advantage in particular that the size for the tiles may be selected efficiently.

According to one specific embodiment, the multiple tiles are formed differently or identically. It is thus provided, for example, that the multiple tiles all have an equal size. For example, it is provided that the multiple tiles each have different sizes. For example, it is provided that the multiple tiles are in part formed identically and are in part formed differently. This thus means in particular that some of the tiles may each have an equal size, while in contrast others of the tiles each have different sizes.

According to one specific embodiment, it is provided that the multiple tiles each have a size of 1 m×2 m or of 1 m×1 m. For example, a selection is made as a function of the above-mentioned parameter or parameters between the size 1 m×2 m and the size 1 m×1 m.

This yields the technical advantage in particular that the parking facility is efficiently divided into typical motor vehicle dimensions.

According to one specific embodiment, it is provided that the control of the traffic includes one or multiple of the following actions: remote controlling of a motor vehicle, ascertaining a setpoint trajectory to be traveled autonomously by a motor vehicle and transmitting the ascertained setpoint trajectory to the motor vehicle, controlling a signaling device and/or a barrier of the parking facility, ascertaining a starting time for carrying out a driverless transfer of a motor vehicle from a starting position inside the parking facility to a destination position inside the parking facility.

The remote control of a motor vehicle includes in particular that one or multiple remote-control commands are transmitted via a communication network to the motor vehicle.

The motor vehicle is thus, for example, remote-controlled with the aid of the device. The device includes, for example, a remote-control unit for remote control of a motor vehicle for this purpose.

By way of the control of a signaling device and/or a barrier of the parking facility, for example, a participant of the traffic may efficiently be prompted to stop or to continue driving, for example.

A signaling device is, for example, an optical signaling device. A signaling device is, for example, an acoustic signaling device. A signaling device is, for example, encompassed by a light signal system. For example, multiple signaling devices are specified, which are designed identically or differently, for example.

For example, multiple barriers are provided. By way of the control of a barrier, for example, a participant of traffic may efficiently be forced to stop or prompted to continue driving, respectively, as a function of whether the barrier is closed or open.

This thus means that the control of a barrier includes closing or opening the barrier.

A starting position inside the parking facility refers, for example, to a drop-off position, at which a driver may stop or has stopped, respectively, his/her vehicle, so that the motor vehicle subsequently parks automatically. In this case, the destination position is in particular a parking position inside the parking facility, i.e., in particular a parking space, for example, a parking bay.

According to one specific embodiment, a starting position is a parking position, in particular a parking space, for example, a parking bay. The motor vehicle is thus stopped at the parking position, i.e., parks at or on it. In this specific embodiment, it is provided that the motor vehicle is guided in a driverless fashion from the parking position to a pick-up position, i.e., the destination position. The pick-up position is a position within the parking facility at which a person may pick up or wishes to pick up, respectively, the motor vehicle.

According to one specific embodiment, the control of the traffic includes a driverless transfer of a motor vehicle from a starting position, which may be, for example, one of the above-mentioned starting positions, to a destination position, which may be, for example, one of the above-mentioned destination positions, within the parking facility.

An object within the meaning of this description is, for example, a motor vehicle, a pedestrian, a bicyclist, or an animal. If the singular is used for the object, the plural is also always meant and vice versa. In the case of multiple objects, they are, for example, identical or different.

According to one specific embodiment, it is provided that the method is carried out with the aid of the device. Device features result similarly from corresponding method features and vice versa. This thus means in particular that technical functionalities of the method result similarly from corresponding technical functionalities of the device and vice versa.

According to one specific embodiment, the device includes a communication interface, which is designed to communicate with a motor vehicle via a communication network.

In another specific embodiment, the device includes a processor, which is designed to ascertain a particular occupancy state of the multiple tiles based on the surroundings sensor data.

According to one specific embodiment, it is provided that the processor is designed to control traffic inside the parking facility based on the ascertained occupancy states.

According to one specific embodiment, it is provided that the processor is designed to divide the parking facility into multiple tiles.

A surroundings sensor within the meaning of the present invention is, for example, one of the following surroundings sensors: radar sensor, LIDAR sensor, laser sensor, video sensor, in particular video sensor of a video camera, ultrasonic sensor, magnetic sensor, infrared sensor, pressure sensor, motion detector, and light barrier sensor.

In one specific embodiment, one or multiple of the above-mentioned surroundings sensors are provided for detecting or monitoring the tiles, respectively.

In one specific embodiment, the parking facility or the device, respectively, includes one or multiple of the above-mentioned surroundings sensor(s).

According to one specific embodiment, the parking facility includes a light barrier (light barrier sensor). According to one specific embodiment, the parking facility includes a pressure sensor as a surroundings sensor. According to one specific embodiment, the parking facility includes a motion detector as a surroundings sensor.

In the case of multiple surroundings sensors, they are designed identically, for example, or differently, for example.

According to one specific embodiment, it is provided that when an object is located in a tile, an actuator of a motor vehicle, for example, a brake, is put in standby. In the case of a brake, this means, for example, that the brake is pre-activated. A reaction time may thus be efficiently reduced.

According to one specific embodiment, it is provided that when an object is located in a tile, the tiles are monitored with the aid of at least one further surroundings sensor which has heretofore not yet monitored the tiles. This yields the technical advantage, for example, that with the aid of the monitoring by the at least one further surroundings sensor, the monitoring with the aid of the surroundings sensors used up to this point may be efficiently checked.

The formulation "respectively" includes in particular the formulation "and/or".

DETAILED DESCRIPTION

Figure 1:
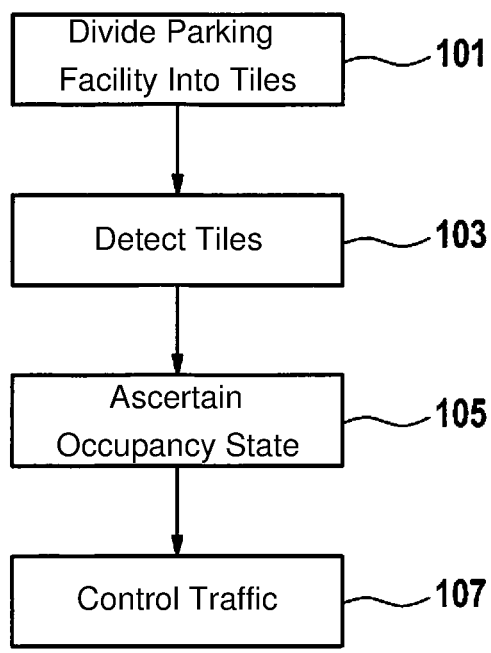
FIG. 1 shows a flowchart of a method for controlling traffic inside a parking facility.

FIG. 1 shows a flow chart of a method for controlling traffic inside a parking facility.

The method includes the following steps:
dividing 101 the parking facility into multiple tiles,
detecting 103 the multiple tiles with the aid of one or multiple surroundings sensor(s), to ascertain surroundings sensor data corresponding to the detection,
ascertaining 105 a particular occupancy state of the multiple tiles based on the surroundings sensor data,
controlling 107 traffic inside the parking facility based on the ascertained occupancy states.

Figure 2:
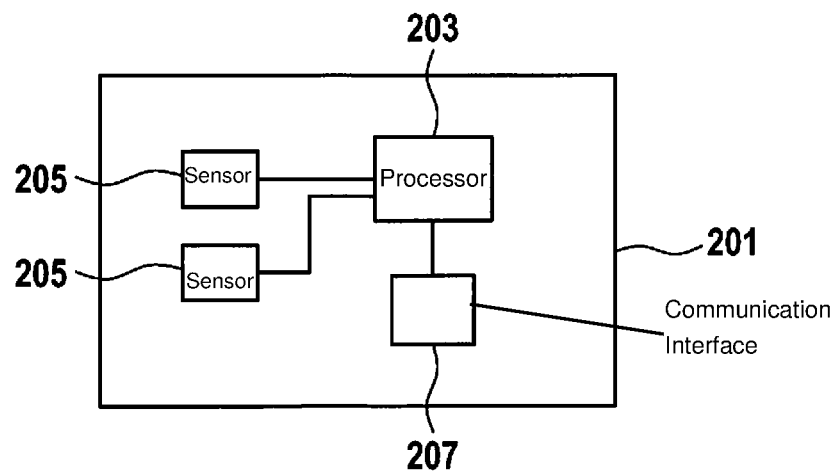
FIG. 2 shows a device for controlling traffic inside a parking facility.

FIG. 2 shows a device 201 for controlling traffic inside a parking facility.

Device 201 is designed to carry out the method for controlling traffic inside a parking facility.

Device 201 includes a processor 203, which is designed to divide the parking facility into multiple tiles.

Device 201 includes multiple surroundings sensors 205, which are designed to detect, i.e., to monitor, one or multiple of the multiple tiles. Surroundings sensors 205 are designed to ascertain surroundings sensor data corresponding to the detection and transmit them to processor 203.

Processor 203 is designed to ascertain a particular occupancy state of the multiple tiles based on the surroundings sensor data of surroundings sensors 205. Processor 203 is furthermore designed to control traffic inside the parking facility based on the ascertained occupancy states.

For example, processor 203 is designed to remotely control a motor vehicle inside the parking facility. A communication interface 207 is provided for this purpose, which is designed to transmit a remote-control command corresponding to the remote control to the vehicle via a communication network.

Communication interface 207 is designed, for example, to receive, via the communication network, surroundings sensor data from one or multiple surroundings sensor(s) of one or multiple motor vehicle(s) which are located inside the parking facility.

Communication interface 207 is designed, for example, to transmit a setpoint trajectory for a motor vehicle via the communication network to the motor vehicle. Such a setpoint trajectory is preferably ascertained with the aid of processor 203 and is in particular a setpoint trajectory which the motor vehicle is to travel along autonomously. Processor 203 preferably ascertains this setpoint trajectory based on the ascertained occupancy states.

For example, processor 203 ascertains a starting point in time or a starting time for carrying out a driverless transfer of a motor vehicle from a starting position inside the parking facility to a destination position inside the parking facility. Communication interface 207 is preferably designed to transmit a starting signal corresponding to the ascertained starting time for the beginning of carrying out the driverless transfer to the motor vehicle via the communication network.

Figure 3:
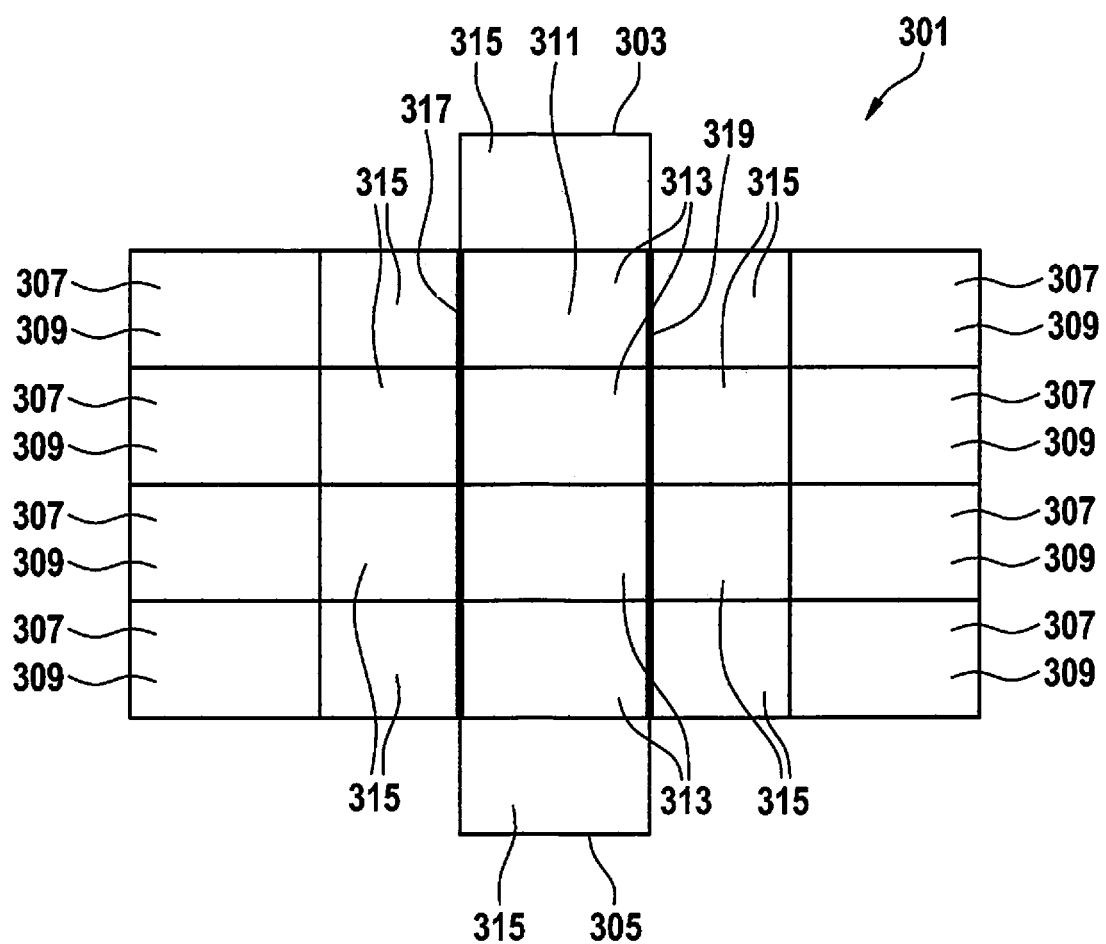
FIG. 3 shows a parking facility for motor vehicles.

FIG. 3 shows a parking facility 301 for motor vehicles.

Parking facility 301 includes an entry 303 and an exit 305 opposite to entry 303.

A lane 311 leads from entry 303 to exit 305. Lane 311 is delimited from the surroundings with the aid of two lines 317, 319.

Parking facility 301 includes multiple parking spaces 307.

Parking facility 301 is divided into tiles as follows:

Tiles 309 are provided, which correspond in their dimensions to the dimensions of parking spaces 307.

Furthermore, tiles 313 are provided which have a width of lane 311 and have a length which is between 0.75 m and 1.5 m. For example, the length of these tiles 313 is 1 m.

Furthermore, tiles 315 are provided which divide the areas of parking facility 301 which are not associated with lane 311 or with parking spaces 307.

Parking facility 301 is thus divided into multiple tiles 309, 313, and 315.

Parking facility 301 includes a device for controlling traffic inside a parking facility. Explicitly showing such a device in FIG. 3 was omitted for the sake of clarity.

Multiple surroundings sensors, which detect, i.e., monitor tiles 309, 313, 315, are situated inside parking facility 301. These surroundings sensors are also not shown for the sake of clarity.

Accordingly, the processor of the device (not shown) may ascertain an occupancy state of tiles 309, 313, 315 based on this monitoring and may control traffic inside parking facility 301 based on the ascertained occupancy states, as described above or hereafter.

The concept according to the present invention thus provides in particular dividing a parking facility into multiple tiles in order to control traffic inside the parking facility.

This thus means that a space, for example, travel paths and/or parking spaces of the parking facility, is divided into fixed tiles, which may also be referred to as zones or grids. The parking facility is thus divided into tiles in the form of a checkerboard, for example.

A tile is, for example, a rectangle having a length of 1 m and a width of a lane. A tile is, for example, a parking space, in particular a parking bay.

According to one specific embodiment, all tiles have the same dimensions.

In another specific embodiment, the tiles have different dimensions.

For example, the tiles have a rectangular or square shape. For example, the tiles have a circular shape.

In particular a rectangular and/or square shape has the advantage that computing time may efficiently be saved here if computations for the control of the traffic are carried out.

These tiles are thus monitored continuously, i.e., regularly, for example, according to the present invention as to whether objects are located inside the tiles.

For planning, i.e., in particular for control of the traffic inside the parking facility, according to one specific embodiment, only the pieces of information relating to the occupancy state are used.

An occupancy state thus indicates whether the tile is occupied or unoccupied, i.e., vacant.

An object type or a position of the object inside the parking facility is preferably not used for the control of the traffic. In particular, no metadata are used. Metadata are, for example, dimensions, i.e., size and/or height and/or length, of a motor vehicle.

According to one specific embodiment, movement profiles of the objects in the tiles are ascertained and used for the control of the traffic. This thus means, for example, that a movement is predicted over time. For example, it is ascertained when a presently occupied tile will become vacant again.

This thus means that for a present occupancy state (vacant or occupied), it is ascertained when this will change with a predetermined probability.

In another specific embodiment, historic occupancy states, which additionally include the information as to when and with which probability a tile will be occupied or vacant in future, are used for the control of the traffic. For example, such historic occupancy states indicate that on a specific day, for example, on Saturday morning, a door which is located in the immediate vicinity of a specific zone (a specific tile) inside the parking facility will be opened with a specific probability and in particular will be opened and closed with a specific frequency.

Essential advantages of the concept according to the present invention may be seen in particular in a simplification of the computations, insofar, for example, as only the presence of objects (occupancy state of the tiles), but no distances between the objects and also no positions of the objects, have to be computed.

In particular, a variety of sensor technologies, for example, light barriers and/or pressure sensors, may thus be used for the monitoring of the tiles.

What is claimed is:

1. A method for controlling traffic inside a parking facility, comprising:
    dividing an entirety of a two-dimensional contiguous area of the parking facility, that includes a plurality of parking spaces and a pathway or pathway network extending between and opening into each of the plurality parking spaces, into a plurality of contiguous tiles;
    for each of the plurality of contiguous tiles:
        using at least one surroundings sensor to perform a respective detection to ascertain respective sensor data corresponding to the respective tile; and
        ascertaining a respective occupancy state of the respective tile based on the sensor data;
    based on the occupancy states of a combination of all of the tiles, ascertaining, for each of one or more vehicles, a respective route including at least a portion of the pathway or pathway network and along which the respective vehicle is to be driven; and
    controlling traffic inside the parking facility based on the one or more ascertained routes;
    wherein, for each of one or more of the plurality of contiguous tiles of the pathway or pathway network, the ascertainment of the respective occupancy state of the respective tile includes ascertaining an occupancy state of an interior region of the respective tile by monitoring a state of each of one or more edges of the respective tile without performing any object sensing at the interior region of the respective tile.

2. The method as recited in claim 1, further comprising:
    based on the sensor data, predicting for each of one or more of the plurality of contiguous tiles, the respective occupancy state of the respective tile at a later time based on a present occupancy state of the respective tile, wherein the ascertainment of the routes is further based on the predicted respective occupancy state.

3. The method as recited in claim 1, wherein the at least one surroundings sensor includes at least one of:
    at least one surroundings sensor of one or more of the vehicles located inside the parking facility; and
    at least one surroundings sensor of the parking facility.

4. The method as recited in claim 1, wherein, for each of one or more of the tiles of the pathway or pathway network, the occupancy state of the respective tile, based on which one or more of the routes is ascertained, is ascertained based on a respective historic occupancy state of the respective tile indicating a respective occupancy state of the respective tile in the past.

5. The method as recited in claim 1, wherein the controlling of the traffic is free of a use of one or multiple of the following parameters: metadata, a type of a detected object, and a distance between two detected objects.

6. The method as recited in claim 2, wherein the controlling of the traffic is performed free of a use of at least one of a height, a width, a length, and a type of a detected motor vehicle.

7. The method as recited in claim 1, wherein the traffic is controlled based on the respective occupancy states of the plurality of contiguous tiles without consideration of a type of an object detected in any of the tiles, a distance between all pairs of all detected objects, distance between the vehicles guided by the traffic control and the detected objects, heights of the detected objects, widths of the detected objects, lengths of the detected objects, and types of the detected objects.

8. The method as recited in claim 1, wherein each of the tiles has a width of a lane of the pathway.

9. The method as recited in claim 1, wherein the parking spaces are parking bays.

10. The method as recited in claim 1, wherein each of the tiles has one of the following shapes: square, rectangle, circle, and ellipse.

11. The method as recited in claim 1, wherein a size of the tiles is selected as a function of at least one of:
- a number of the at least one surroundings sensor;
- a detection accuracy of the at least one surroundings sensor; and
- an object velocity of a detected object.

12. The method as recited in claim 1, wherein the controlling includes at least one of
- remotely controlling the vehicles;
- transmitting respective ones of the routes to the one or more vehicles;
- controlling at least one of a signaling device and a barrier of the parking facility; and
- ascertaining a starting time for carrying out a driverless transfer of one of the one or more vehicles from a starting position inside the parking facility to one of the parking spaces inside the parking facility selected as a destination position.

13. A device for controlling traffic inside a parking facility, comprising:
- at least one processor; and
- an interface to at least one surroundings sensor;
- wherein the at least one processor is configured to:
  - divide an entirety of a two-dimensional contiguous area of the parking facility, that includes a plurality of parking spaces and a pathway or pathway network extending between and opening into each of the plurality parking spaces, into a plurality of contiguous tiles;
  - for each of the plurality of contiguous tiles:
    - obtain from the at least one surroundings sensor and via the interface respective sensor data corresponding to the respective tile; and
    - ascertain a respective occupancy state of the respective tile based on the sensor data;
  - based on the occupancy states of a combination of all of the tiles, ascertaining, for each of one or more vehicles, a respective route including at least a portion of the pathway or pathway network and along which the respective vehicle is to be driven; and
  - control traffic inside the parking facility based on the one or more ascertained routes;
- wherein, for each of one or more of the plurality of contiguous tiles of the pathway or pathway network, the ascertainment of the respective occupancy state of the respective tile includes ascertaining an occupancy state of an interior region of the respective tile by monitoring a state of each of one or more edges of the respective tile without performing any object sensing at the interior region of the respective tile.

14. A parking facility for motor vehicles, the parking facility comprising:
- a device for controlling traffic inside the parking facility, the device including:
  - at least one processor; and
  - an interface to at least one surroundings sensor;
- wherein the at least one processor is configured to:
  - divide an entirety of a two-dimensional contiguous area of the parking facility, that includes a plurality of parking spaces and a pathway or pathway network extending between and opening into each of the plurality parking spaces, into a plurality of contiguous tiles;
  - for each of the plurality of contiguous tiles:
    - obtain from the at least one surroundings sensor and via the interface respective sensor data corresponding to the respective tile; and
    - ascertain a respective occupancy state of the respective tile based on the sensor data;
  - based on the occupancy states of a combination of all of the tiles, ascertaining, for each of one or more vehicles, a respective route including at least a portion of the pathway or pathway network and along which the respective vehicle is to be driven; and
  - control traffic inside the parking facility based on the one or more ascertained routes;
- wherein, for each of one or more of the plurality of contiguous tiles of the pathway or pathway network, the ascertainment of the respective occupancy state of the respective tile includes ascertaining an occupancy state of an interior region of the respective tile by monitoring a state of each of one or more edges of the respective tile without performing any object sensing at the interior region of the respective tile.

15. A non-transitory computer-readable medium on which are stored instructions that are executable by a computer and that, when executed by the computer, causes the computer to perform a method for controlling traffic inside a parking facility, the method comprising:
- dividing an entirety of a two-dimensional contiguous area of the parking facility, that includes a plurality of parking spaces and a pathway or pathway network extending between and opening into each of the plurality parking spaces, into a plurality of contiguous tiles;
- for each of the plurality of contiguous tiles:
  - obtaining from at least one surroundings sensor respective sensor data corresponding to the respective tile; and
  - ascertaining a respective occupancy state of the respective tile based on the sensor data;
- based on the occupancy states of a combination of all of the tiles, ascertaining, for each of one or more vehicles, a respective route including at least a portion of the pathway or pathway network and along which the respective vehicle is to be driven; and
- controlling traffic inside the parking facility based on the one or more ascertained routes;
- wherein, for each of one or more of the plurality of contiguous tiles of the pathway or pathway network, the ascertainment of the respective occupancy state of the respective tile includes ascertaining an occupancy state of an interior region of the respective tile by monitoring a state of each of one or more edges of the respective tile without performing any object sensing at the interior region of the respective tile.

* * * * *